(12) United States Patent
Park et al.

(10) Patent No.: US 8,636,365 B2
(45) Date of Patent: Jan. 28, 2014

(54) PROJECTION DISPLAY DEVICE AND DRIVING METHOD OF THE SAME

(75) Inventors: Chan-Young Park, Suwon-si (KR); Hye-Dong Kim, Suwon-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 60 days.

(21) Appl. No.: 12/382,995

(22) Filed: Mar. 27, 2009

(65) Prior Publication Data

US 2009/0244406 A1  Oct. 1, 2009

(30) Foreign Application Priority Data

Mar. 31, 2008  (KR) .................. 10-2008-0029749

(51) Int. Cl.
- G03B 21/00 (2006.01)
- G03B 21/26 (2006.01)
- G03B 21/14 (2006.01)
- G02F 1/00 (2006.01)

(52) U.S. Cl.
USPC .................. 353/31; 353/34; 353/82; 348/750

(58) Field of Classification Search
USPC .................. 353/31, 30, 34, 82; 348/750, 751; 359/634, 629, 638
See application file for complete search history.

(56) References Cited

U.S. PATENT DOCUMENTS

| | | | |
|---|---|---|---|
| 5,812,223 A | | 9/1998 | Noguchi |
| 5,864,374 A | * | 1/1999 | Ito et al. ........................ 348/757 |
| 6,607,277 B2 | | 8/2003 | Yokoyama et al. |
| 7,303,284 B2 | * | 12/2007 | Imade .............................. 353/31 |
| 7,607,784 B2 | * | 10/2009 | Shimaoka et al. ............... 353/85 |
| 2003/0214607 A1 | | 11/2003 | Kitazawa et al. |
| 2004/0070736 A1 | * | 4/2004 | Roddy et al. ..................... 353/31 |
| 2005/0046753 A1 | | 3/2005 | Kwak |
| 2006/0203202 A1 | * | 9/2006 | Uchiyama et al. .............. 353/31 |

FOREIGN PATENT DOCUMENTS

| | | |
|---|---|---|
| CN | 1476718 A | 2/2004 |
| EP | 0 741 312 A | 11/1996 |
| EP | 1 427 221 A | 6/2004 |
| GB | 2 100 547 A | 12/1982 |
| JP | 04-044490 A | 2/1992 |
| JP | 08-294138 A | 11/1996 |
| JP | 08-297238 A | 11/1996 |
| JP | 2002-287247 A | 10/2002 |
| JP | 2004-62113 A | 2/2004 |
| JP | 2006-18196 A | 1/2006 |
| JP | 2007-025546 A | 2/2007 |
| KR | 10-1999-0071622 A | 9/1999 |
| KR | 10-2004-0009312 A | 1/2004 |
| KR | 10-2006-0125235 A | 12/2006 |
| WO | WO 2006/044298 A1 | 4/2006 |

\* cited by examiner

*Primary Examiner* — William C Dowling
*Assistant Examiner* — Ryan Howard
(74) *Attorney, Agent, or Firm* — Lee & Morse, P.C.

(57) ABSTRACT

A projection display device includes first to third display panels configured to realize first to third color images and a fourth display panel configured to realize a white image. The first to third color images and the white image may be combined and projected.

20 Claims, 5 Drawing Sheets

PROJECTION DISPLAY DEVICE AND DRIVING METHOD OF THE SAME

BACKGROUND

1. Field

Embodiments relate to a projection display device. More particularly, embodiments relate to a projection display device that can improve luminance of an image projected and a driving method thereof.

2. Description of the Related Art

In general, a projection display device includes a first display panel for realizing a red image, a second display panel for realizing a green image, a third display panel for realizing a blue image, a combination member for combining images realized in the first to third display panels as a color image, and a projection lens system that projects the combined color image, e.g., onto a large screen.

A liquid crystal display (LCD) panel, a liquid crystal on silicon (LCOS) panel, and a digital light processing (DLP) panel may be used as display panels of the projection display device. The LCOS panel includes LCDs having liquid cells formed on a semiconductor instead of a glass substrate. The DLP panel has hundreds of thousands of digital micro-mirror device (DMD) chips each performing a switch operation more than five hundred thousands times per second, and realizing an image by controlling a reflection angle of each DMD chip.

However, since the above three types of display panels cannot emit light themselves, they need a high luminance light source and an illumination lens system for providing light emitted from the light source to a display panel. The light source includes a white light source, e.g., a high pressure mercury vapor lamp, or a light source using lasers for red, green, and blue wavelengths.

Therefore, a conventional projection display device consumes a large amount of power and generates noise due to a cooling fan used to remove heat generated by the light sources. Further, the structure of the conventional projection type display device cannot be downsized, since the illumination lens system and the projection lens system have complicated structures.

Recently, in order to overcome these drawbacks, a projection display device that uses a self-emissive display panel, e.g., an organic light emitting display panel, has been proposed. When self-emissive display panels are used, the light source and the illumination lens system can be omitted, thereby simplifying the internal structure and reducing size.

However, when used in projection display devices, the self-emissive display panels cannot provide sufficient luminance compared with display panels that use a conventional light source. Accordingly, luminance of a projected image is deteriorated.

The above information disclosed in this Background section is only for enhancement of understanding of the background of the invention and therefore it may contain information that does not form the prior art that is already known in this country to a person of ordinary skill in the art.

SUMMARY

Embodiments are therefore directed to a projection display device and a driving method thereof, which substantially overcome one or more of the disadvantages of the related art.

It is a feature of an embodiment to provide a projection display device providing an image having improved luminance.

An exemplary projection type display device according to an embodiment of the present invention includes a first display panel configured to realize a first color image, a second display panel configured to realize a second color image, a third display panel configured to realize a third color image, the first, second, and third colors being different, a fourth display panel configured to realize a white image, and an optical system configured to combine the first to third color images and the white image, and to project a combined image.

The optical system may include a first combining member configured to combine images from the first to third display panels as a full color image, a second combining member configured to combine the full color image from the first combining member and the white image from the fourth display panel, and a projection lens system configured to receive an image from the second combining member, and to project the image.

The first combining member may include a dichroic prism. The first to third display panels may be placed respectively facing the left side, the right side, and the rear of the first combining member. The fourth display panel may be placed in parallel with and closer to the second combining member than one of the first to third display panels.

The second combining member may be include a dichroic filter, and may be placed at an angle of 45° from the first combining member and the fourth display panel in the front of the first combining member, i.e., closer to the projection lens system.

The fourth display panel may display a white image according to a luminance signal of each grayscale of the color image. The fourth display panel may be configured to display the white image having an increased grayscale when the grayscale of the full color image is greater than a predetermined level. The fourth display panel may be configured to display the white image having a decreased grayscale when the grayscale of the full color image is less than a predetermined level.

The first to fourth display panels may be self-emissive, e.g., may be organic light emitting display panels. Alternatively, the first to third display panels may self-emissive, while the fourth display panel may be a passive display panel including a light source. The first to third display panels may be organic light emitting display panels, and the fourth display panel may be a transmission liquid crystal display panel.

An exemplary projection type display device according to another embodiment of the present invention includes a first display panel displaying a first color image during a first period of one frame period, a second display panel displaying a second color image during a second period on the one frame period, a third display panel displaying a third color image during a third period of the one frame period, a fourth display panel displaying a white image during a fourth period of the one frame period, and an optical system configured to combine the first to third color images and the white image, and project a combined image.

The one frame period may be divided into four periods, and the first to fourth periods may respectively correspond to the four periods. The first to fourth periods may be equal to one another. The first to third colors may respectively correspond to red, green, and blue.

The first to third periods may be equal to one another, and the fourth period may correspond to a period exclusive of the first to third periods in the one frame period. The first to third periods may be longer than the fourth period. The first to third colors may respectively correspond to red, green, and blue.

An exemplary driving method of a projection type display device according to another embodiment of the present invention includes displaying a first color image, displaying a second color image, displaying a third color image, displaying a white image, combining the first to third color images and the white image, and projecting the combined image.

Displaying the first color image may include displaying the first color image during a first period of one frame period. Displaying the second color image may include displaying the second color image during a second period of the one frame period. Displaying the third color image may include displaying the third color image during a third period of the one frame period. Displaying the white image may include displaying the white color image during a fourth period of the one frame period.

The one frame period may be divided into four periods, and the first to fourth periods may respectively correspond to the four periods. The first to third periods respectively correspond to each other, and the fourth period corresponds to a period except for the first to third periods in the one frame period. The first to third periods may be longer than the fourth period. The first to third colors may respectively correspond to red, green, and blue.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 1-2008-0029749, filed on Mar. 31, 2008, in the Korean Intellectual Property Office, and entitled: "Projection Display Device and Driving Method of the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

As will be described in detail below, the projection display according to embodiments may include a display panel for realizing a white image in addition to three display panels respectively realizing color images. Accordingly, the projection display device according may use a white image to improve the luminance of the display. Thus, self-emissive display panels may be effectively used in projection display devices.

Figure 1:
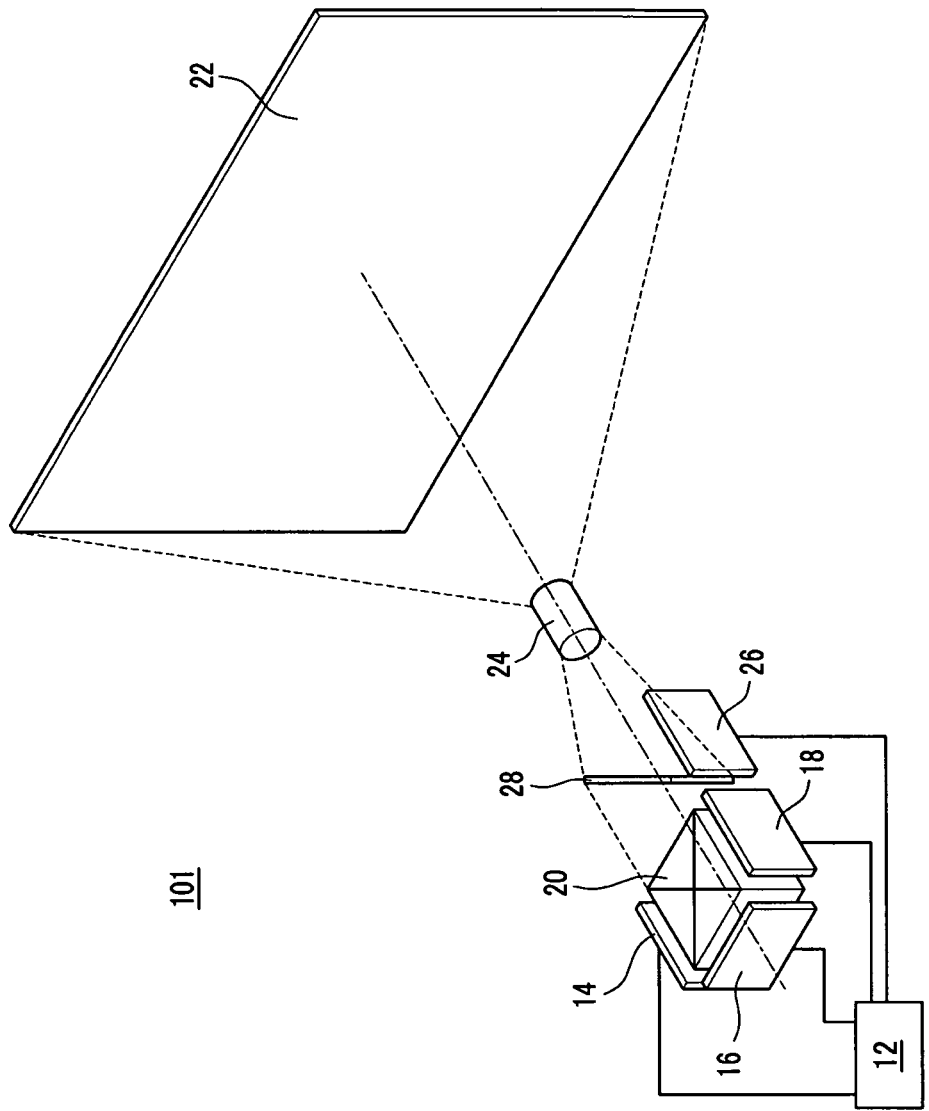
FIG. 1 illustrates a perspective view of a projection display device according to a first exemplary embodiment of the present invention.
Figure 2:
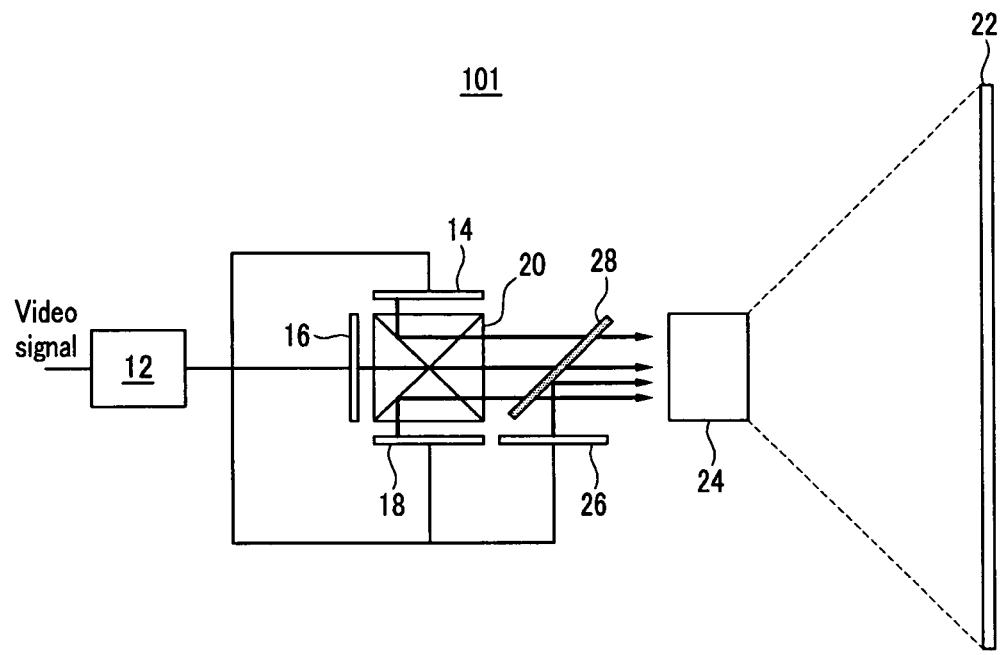
FIG. 2 illustrates a top plan view of the projection display device according to the first exemplary embodiment of the present invention.

FIG. 1 and FIG. 2 respectively illustrate a perspective view and a top plan view of a projection display device according to a first exemplary embodiment of the present invention.

Referring to FIG. 1 and FIG. 2, a projection display device 101 according to the present exemplary embodiment may include an image processing unit 12 that receives a video signal and processes the video signal, a first display panel 14 realizing a red image, a second display panel 16 realizing a green image, a third display panel 18 realizing a blue image, a first combining member 20 combining images realized by the first to third display panels 14, 16, and 18 as a full color image, and a projection lens system 24 projecting the combined color image to a screen 22 having a large size.

The image processing unit 12 may generate red, green, and blue video signals from an input video signal, and transmit the red video signal to the first display panel 12, the green video signal to the second display panel 16, and the blue video signal to the third display panel 18.

The first combining member 20 may include, e.g., a hexahedral dichroic prism. The first to third display panels 14, 16, and 18 may be respectively placed to face the left side, the right side, and a rear side of the first combining member 20. In this particular example, the front of the first combining member 20 faces the projection lens system 24 and the screen 22. Interior surfaces of the first combining member may be inclined at an angle of 45°.

The red image of the first display panel 14 may be reflected at a surface of the first combining member 20 and transferred to the front of the first combining member 20. The green image of the second display panel 16 may pass through the first combining member 20 to the front of the first combining member 20. The blue image of the third display panel 18 may be reflected by another surface of the first combining member 20 to the front of the first combining member 20. Here, the other edge of the first combining member 20 is inclined at an angle of 45°. Accordingly, the red, green, blue images may be combined as a color image at and be output from the front of the first combining member 20.

In addition, the projection display device 101 according to the present exemplary embodiment may include a fourth display panel 26 displaying a white image and a second combining member 28 combining the full color image and the white image so as to increase luminance of a color image projected to the screen 22. The image processing unit 12 may extract grayscale data by analyzing an input video signal, generate a white video signal according to the grayscale data, and transmit the white video signal to the fourth display panel 18. When the extracted grayscale data is lower than a specific grayscale, the image processing unit 12 may generate a white video signal that corresponds to a grayscale that is lower than the extracted grayscale by a predetermined low level and transmit the white video signal to the fourth display panel 26. When the extracted grayscale data is higher than the specific grayscale, the image processing unit 12 may generate a white video signal that corresponds to a grayscale that is higher than the extracted grayscale by a predetermined high level and transmit the white video signal to the fourth display panel 26. Thus, contrast deterioration may be prevented by an image of the fourth display panel 26.

For example, when a grayscale of the input video signal is lower than a predetermined low level, e.g., 50, the image processing unit 12 may decrease the ratio of the extracted grayscale, e.g., by 60%, and generate a white video signal that corresponds to the decreased grayscale. When the grayscale of the input video signal is higher than a predetermined high level, e.g., 180, the image processing unit 12 may increase the ratio of the extracted grayscale, e.g., by 120%, and generate a white video signal that corresponds to the increased grayscale.

The fourth display panel 26 displays a white image (i.e., black and white images) according to an input signal. The fourth display panel 26 may be placed in parallel with and in front of, i.e., closer to the screen 22, the first display panel 14 or the third display panel 18. For example, in FIG. 1 and FIG. 2, the fourth display panel 26 is placed in the front of the third display panel 18.

The second combining member 28 may be include a plate-shaped dichroic filter placed in the front of the first combining member 20 at an angle, e.g., of about 45°, from the fourth display panel 26 and the first combining member 20. The second combining member 28 may transmit the color image output from the first combining member 20 and reflect a white image of the fourth display panel 26 to combine the color image and the white image. The projection lens system 24 may then project the combined image in a large size to the screen 22.

As described, since the projection display device 101 includes the fourth display panel 26 and the second combining member 28, the color image with addition of the white image is displayed on the screen 22. Thus, the color displayed on the screen 22 may have a high luminance characteristic due to the added white image.

In the present exemplary embodiment, the first to fourth display panels 14, 16, 18, and 26 may be self-emissive, e.g., a plasma display panel, a field emission display panel, an organic light emitting display panel, etc. In particular, the first to fourth display panels 14, 16, 18, and 26 may be an organic light emitting display panel, since organic light emitting panels provide numerous advantages, e.g., a small form factor, low power consumption, and fast response time.

Therefore, according to the present exemplary embodiment, an internal structure of the projection display device 101 may be simplified even while including the fourth display panel 26 and the second combining member 28, and the entire size of the projection display device 101 may be reduced.

Figure 3:
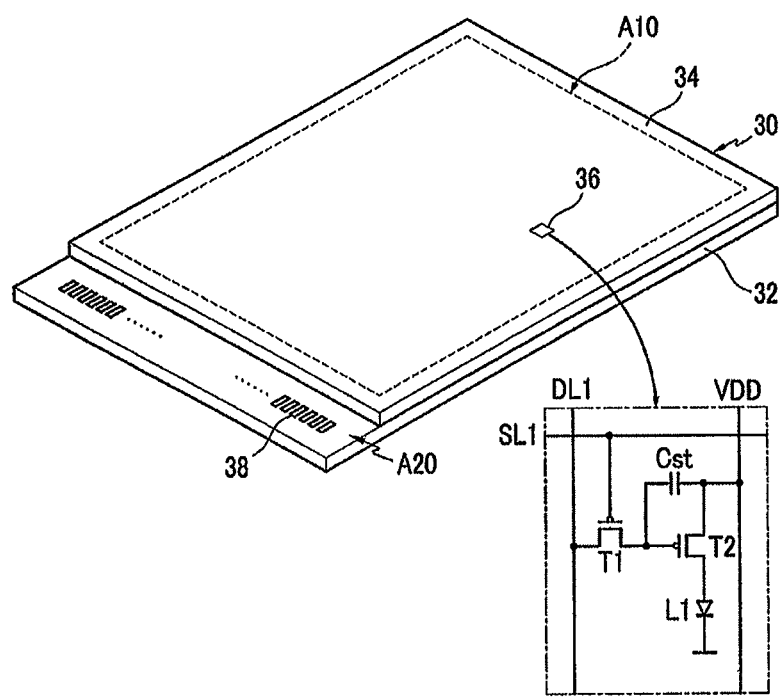
FIG. 3 illustrates a perspective view of an organic light emitting display panel that realizes first to fourth display panels according to an exemplary embodiment of the present invention.

FIG. 3 illustrates a perspective view of the organic light emitting display panel that realizes the first to fourth display panels 14, 16, 18, and 26 according to an exemplary embodiment of the present invention.

Referring to FIG. 3, an organic light emitting display panel 30 may include a first substrate 32 and a second substrate 34 bonded to the first substrate 32, e.g., by a sealant. A pixel area A10 that displays an actual image may be provided within the sealed portion between the two substrates 32, 34. A pad area A20 may be located on one of the substrates, e.g., the first substrate 32, outside of the sealed portion.

A plurality of pixels 36 may be disposed in a matrix format in the pixel area A10 of the first substrate 32. A scan driver (not shown) and a data driver (not shown) for driving the plurality of pixels 36 may be located in an external side of the pixel area A10. A plurality of pad electrodes 38 for transmitting electrical signals to the scan driver and the data driver may be formed in the pad area A20 of the first substrate 32.

Each pixel 36 may include an organic light emitting element L1 and a driving circuit. The organic light emitting element L1 may include an anode, an organic emission layer, and a cathode. The driving circuit may include a switching transistor T1, a driving transistor T2, and a storage capacitor Cst. The configuration of the driving circuit is not limited to the above description.

The switching transistor T1 may be connected to a scan line SL1 and a data line DL1, and may transmit a data voltage input to the data line DL1 to the driving transistor T2 according to a switching voltage input to the scan line SL1. The storage capacitor Cst may be connected to the switching transistor T1 and a power source line VDD, and may store a voltage Vgs that corresponds to a voltage difference between a voltage transmitted from the switching transistor T1 and a voltage supplied to the power source line VDD.

The driving transistor T2 may be connected to the power source line VDD and the storage capacitor Cst, and may supply an output current that is proportional to the square of a difference between the voltage Vgs stored in the storage capacitor Cst and a threshold voltage Vth to the organic light emitting element L1. The organic light emitting element L1 emits light in accordance with the output current.

The first display panel 14 in each pixel may include a red organic emission layer, the second display panel 16 in each pixel may include a green organic emission layer, and the third display panel 18 in each pixel may include a blue organic emission layer. In addition, the fourth display panel 26 in each pixel may include a white organic emission layer.

Figure 4:
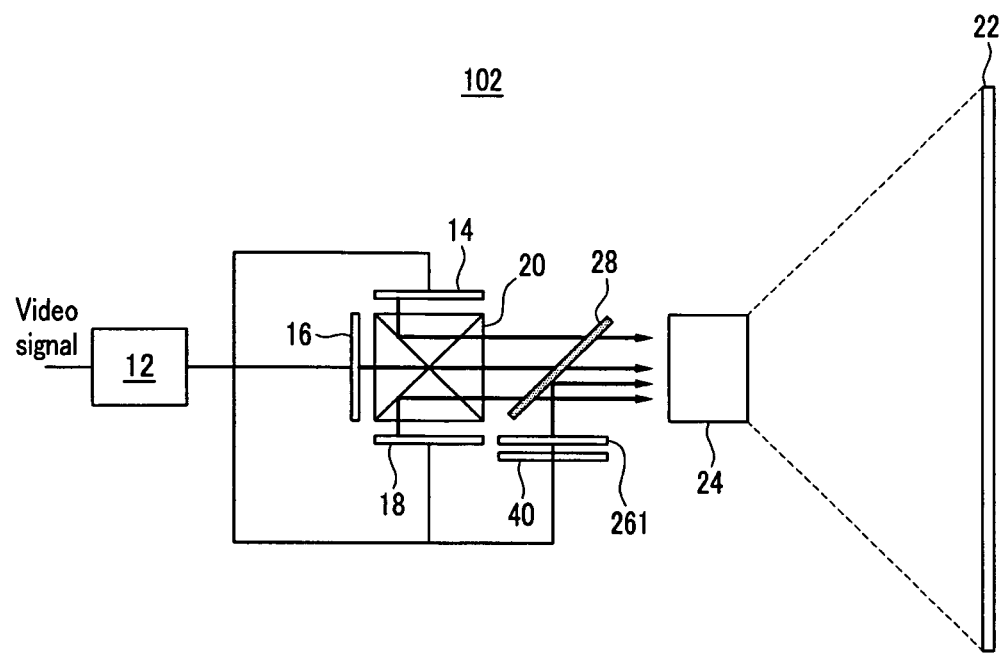
FIG. 4 illustrates a top plan view of a project display device according to a second exemplary embodiment of the present invention.

FIG. 4 is a top plan view of a projection display device 102 according to a second exemplary embodiment of the present invention.

Referring to FIG. 4, the projection display device 102 according to the present exemplary embodiment may have the same structure as the first exemplary embodiment, except that a fourth display panel 261, i.e., the white light display panel, may be a passive display. A light source 40 may be provided for the fourth display panel 261 at a rear thereof. Like reference numerals in the second exemplary embodiment designate like elements in the first exemplary embodiment.

For example, the fourth display panel 261 may be a transmission liquid crystal display panel. Each pixel may include a white color filter for realizing a white image.

Operation of the projection display device according to the first and second exemplary embodiments of the present invention will now be described with reference to FIG. 5 and FIG. 6.

Figure 5:
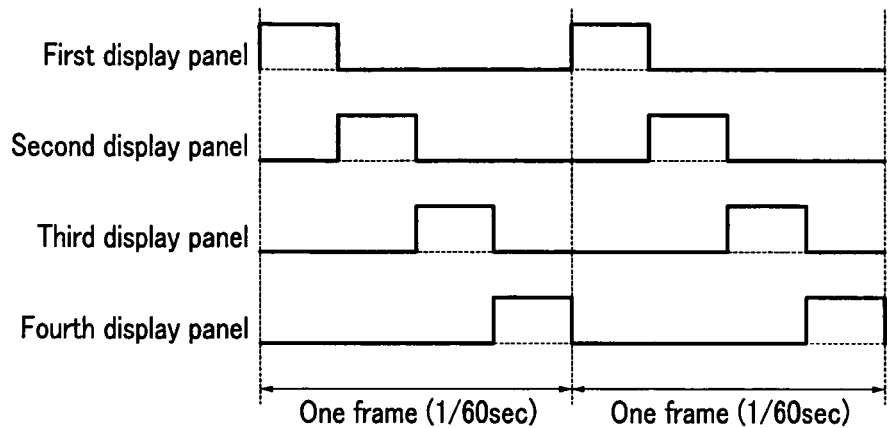
FIG. 5 illustrates a method according to an exemplary embodiment of the present invention for operating the projection display devices of the first and second exemplary embodiments of the present invention.

FIG. 5 illustrates an operation method according to a third exemplary embodiment of the present invention for operating the projection display device according to the first and second exemplary embodiments of the present invention. In further detail, FIG. 5 shows an image display period of the first to fourth display panels 14, 16, 18, and 26 (261) during one frame period.

As shown in FIG. 5, first to fourth display panels 14, 16, 18, and 26 (261) of a projection display device according to an embodiments may be driven in a time-division manner. The projection display device may divide one frame into four periods, and may control each of the first to fourth display panels 14, 16, 18, and 26 (261) to emit light during one of the four periods.

FIG. 5 exemplarily shows a light emission period of each display panel in the case in which the first to fourth display panels 14, 16, 18, and 26 sequentially emit light. The first to fourth display panels 14, 16, 18, and 26 (261) may not sequentially emit light, and a light emission period of each of the first to fourth display panels 14, 16, 18, and 26 may be different from each other. However, if each display panel has a different light emitting period, a different video signal is input to each display panel for expressing the same grayscale.

When the first to fourth display panels 14, 16, 18, and 26 (261) sequentially display images, after-images of the images displayed on the respective display panels may be combined together so that a color image is displayed. The image displayed on the fourth display panel 26 (261) only expresses luminance of the image. Luminance of each of the plurality of pixels in the fourth display panel 26 (261) may be determined by grayscale data of each pixel included in a white video signal.

Figure 6:
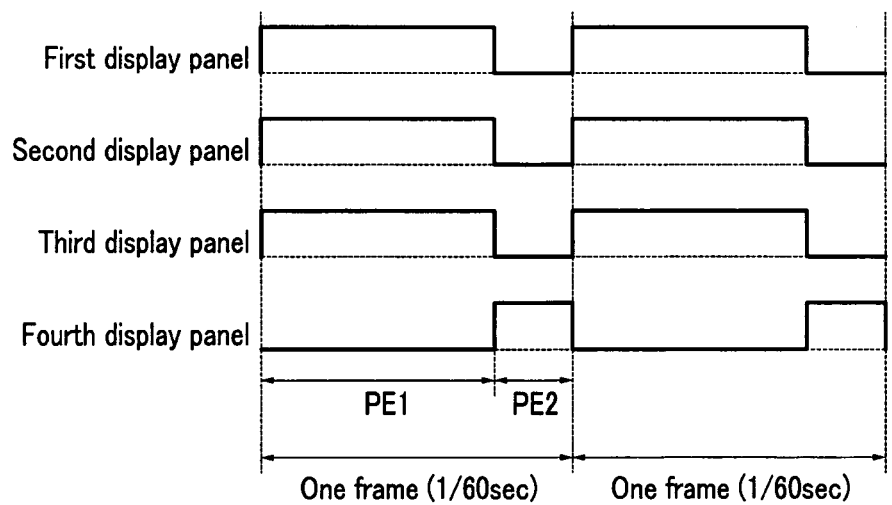
FIG. 6 illustrates a method according to an embodiment of the present invention for operating the projection display devices of the first and second exemplary embodiments of the present invention.

FIG. 6 illustrates a method according for operating the projection display device according to the first and second exemplary embodiments of the present invention. In further detail, FIG. 6 illustrates an image display period of first to fourth display panels 14, 16, 18, and 26 (261) during one frame period.

As shown in FIG. 6, a projection display device according may drive the first to fourth display panels 14, 16, 18, and 26 (261) by dividing one frame period into a period PE1 for displaying red, green, and blue, and a period PE2 for displaying white.

As shown in FIG. 6, images may be displayed on the first to third display panels 14, 16, and 18 during the period PE1, and an image is displayed on the fourth display panel 26 (261) during the period PE2. The period PE1 may correspond to three times the period PE2. Then, the projection display device according to embodiments may provide an image that is brighter than the projection display device that operates as shown in FIG. 5.

The white image display periods shown in FIG. 5 and FIG. 6 may be determined in consideration of a color shift that can occur due to addition of a white image when the entire image is a single color. That is, the color shift should be prevented by controlling the image display periods of the first to third display panels and the white image display period of the fourth display panel. The image processing unit 12 may control an allowable level of a white image for each color using pre-generated data.

As described, the projection display device according to the exemplary embodiments of the present invention may include the fourth display panel 26 (261) displaying a white color. Thus, the projection display device according to the exemplary embodiments may provide a brighter image than a conventional projection display device. Further, loads of the first to third display panels 14, 16, and 18 may be reduced in the case of displaying an almost entirely white image.

Exemplary embodiments of the present invention have been disclosed herein, and although specific terms are employed, they are used and are to be interpreted in a generic and descriptive sense only and not for purpose of limitation. For example, while red, green, and blue images have been discussed, other formats, e.g., luminance-chrominance formats may be employed. Further, while embodiments have illustrated combining members providing a full color image, which is then combined with a white image, these four images may be combined in any order, e.g., two color images may be combined by one combiner, which may be output to another combiner to be combined with the third color image and the white image. Accordingly, it will be understood by those of ordinary skill in the art that various changes in form and details may be made without departing from the spirit and scope of the present invention as set forth in the following claims.

What is claimed is:

1. A projection display device, comprising:
   a first display panel configured to realize an image of only a first color;
   a second display panel configured to realize an image of only a second color;
   a third display panel configured to realize an image of only a third color, the first, second, and third colors being different;
   a fourth display panel configured to realize only a white image;
   an optical system configured to combine the images of the first to third colors into a full color image, to combine the full color image and the white image into a combined image, and to project the combined image onto a screen; and
   an image processing unit configured to transmit a video signal into the first through third display panels and to extract grayscale data from the video signal,
   wherein the first to third display panels are self-emissive,
   wherein the fourth display panel is between the screen and one of the first to third display panels, the fourth display panel being configured to display the white image according to a grayscale of the full color image,
   wherein, when the extracted grayscale data is lower than a specific grayscale, the image processing unit is configured to generate a white video signal that corresponds to a grayscale that is lower than the extracted grayscale by a predetermined low level, and to transmit the white video signal to the fourth display panel, and
   wherein, when the extracted grayscale data is higher than a specific grayscale, the image processing unit is configured to generate a white video signal that corresponds to a grayscale that is higher than the extracted grayscale by a predetermined high level and to transmit the white video signal to the fourth display panel.

2. The projection display device as claimed in claim 1, wherein the optical system comprises a first combining member including a dichroic prism, wherein the first to third display panels are placed respectively facing the left side, the right side, and the rear of the first combining member.

3. The projection display device as claimed in claim 2, wherein the fourth display panel is placed in parallel with and in front of one of the first to third display panels, a distance between the screen and the fourth display panel being smaller than a distance between the screen and any one of the first to third display panels.

4. The projection display device as claimed in claim 3, wherein the optical system further comprises a second combining member including a dichroic filter, the second combining member being placed in the front of the first combining member at an angle of 45° from the first combining member and the fourth display panel.

5. The projection display device as claimed in claim 1, wherein the fourth display panel is configured to display the white image having an increased grayscale when the grayscale of the full color image is greater than a predetermined level.

6. The projection display device as claimed in claim 1, wherein the fourth display panel is configured to display the white image having a decreased grayscale when the grayscale of the full color image is less than a predetermined level.

7. The projection display device as claimed in claim 1, wherein the fourth display panel is self-emissive.

8. The projection display device as claimed in claim 7, wherein the first to fourth display panels are organic light emitting display panels.

9. The projection display device as claimed in claim 1, wherein the fourth display panel is a passive display panel including a light source.

10. The projection display device as claimed in claim 9, wherein the first to third display panels are organic light emitting display panels, and the fourth display panel is a transmission liquid crystal display panel.

11. The projection display device as claimed in claim 1, wherein an input signal of the fourth display is separate from an output signal of the full color image, the input signal of the fourth display being a video signal based on grayscale data extracted from the full color image.

12. A projection display device, comprising:
a first display panel configured to display a first color image during a first period of one frame period;
a second display panel configured to display a second color image during a second period of the one frame period;
a third display panel configured to display a third color image during a third period of the one frame period, the first, second, and third colors being different, and the first, second, and third periods being equal to each other;
a fourth display panel configured to display a white image during a fourth period of the one frame period;
an image processing unit configured to input first through third signals directly into the first through third display panels, respectively, and to extract grayscale data from the first through third signals, the first through third signals being separate signals corresponding to the first through third colors, respectively; and
an optical system configured to combine the first to third color images and the white image, and to project the combined image, the white image corresponding to a grayscale of the combined first to third color images,
wherein, when the extracted grayscale data is lower than a specific grayscale, the image processing unit is configured to generate a white video signal that corresponds to a grayscale that is lower than the extracted grayscale by a predetermined low level, and to transmit the white video signal to the fourth display panel, and
wherein, when the extracted grayscale data is higher than a specific grayscale, the image processing unit is configured to generate a white video signal that corresponds to a grayscale that is higher than the extracted grayscale by a predetermined high level and to transmit the white video signal to the fourth display panel.

13. The projection display device as claimed in claim 12, wherein the one frame period is divided into four periods, and the first to fourth periods respectively correspond to the four periods.

14. The projection display device as claimed in claim 13, wherein the first to fourth periods are equal to each other.

15. The projection display device as claimed in claim 12, wherein the fourth period corresponds to a period exclusive of the first to third periods in the one frame period.

16. The projection display device as claimed in claim 15, wherein the first to third periods are longer than the fourth period.

17. The projection display device as claimed in claim 12, wherein the first to third periods are longer than the fourth period.

18. A driving method of a projection display device, the method comprising:
displaying a first color image during a first period;
displaying a second color image during a second period;
displaying a third color image during a third period, the first through third periods being equal to each other;
displaying a white image for a length of about ¼ of a frame, the length of displaying the white image being equal to or shorter than each of the first through third periods;
combining the first to third color images and the white image, such that the white image adjusts a grayscale of the combined first to third color images; and
projecting the combined image,
wherein, when grayscale data extracted from an input signal is lower than a specific grayscale, the white video signal is adjusted to correspond to a grayscale that is lower than the extracted grayscale by a predetermined low level, and
wherein, when the grayscale data extracted from the input signal is higher than a specific grayscale, the white video signal is adjusted to correspond to a grayscale that is higher than the extracted grayscale by a predetermined high level.

19. The driving method as claimed in claim 18, wherein:
displaying the first color image includes displaying the first color image during a first period of one frame period;
displaying the second color image includes displaying the second color image during a second period of the one frame period;
displaying the third color image includes displaying the third color image during a third period of the one frame period; and
displaying the white image includes displaying the white color image during a fourth period of the one frame period.

20. The driving method as claimed in claim 19, wherein the first to third periods are longer than the fourth period.

* * * * *